L. R. HOFF.
ASBESTOS BRAKE BAND.
APPLICATION FILED JULY 28, 1908.

997,818.

Patented July 11, 1911.

Witnesses:

Inventor
Louis R. Hoff
By his Attorney

UNITED STATES PATENT OFFICE.

LOUIS R. HOFF, OF PATERSON, NEW JERSEY, ASSIGNOR, BY MESNE ASSIGNMENTS, TO THE ASBESTOS BRAKE COMPANY, A CORPORATION OF NEW JERSEY.

ASBESTOS BRAKE-BAND.

997,818.  Specification of Letters Patent.  Patented July 11, 1911.

Application filed July 28, 1908. Serial No. 445,716.

*To all whom it may concern:*

Be it known that I, LOUIS R. HOFF, a citizen of the United States of America, and a resident of the city of Paterson, Passaic county, State of New Jersey, have invented certain new and useful Improvements in Asbestos Brake-Bands, of which the following is a specification.

My invention relates to apparatus for checking the speed of revolution of rotating members of various mechanism, as in wheeled vehicles, hoisting machinery and the like, and comprises an improved flexible brake band adapted to be used as a facing for the ordinary metal brake band, and to bear upon the drum or other revolving member when the brake is set. Heretofore such brake band facings have sometimes been made of hair felt or other animal or vegetable fiber, these being used to give evenness and regularity to the braking action, but these materials burn out and wear out rapidly when heavy brake pressures are used, and do not have a sufficiently high retarding action. I have discovered that if such brake bands are faced with strips of woven asbestos fiber the above recited difficulties are overcome in large part.

Figure 1:
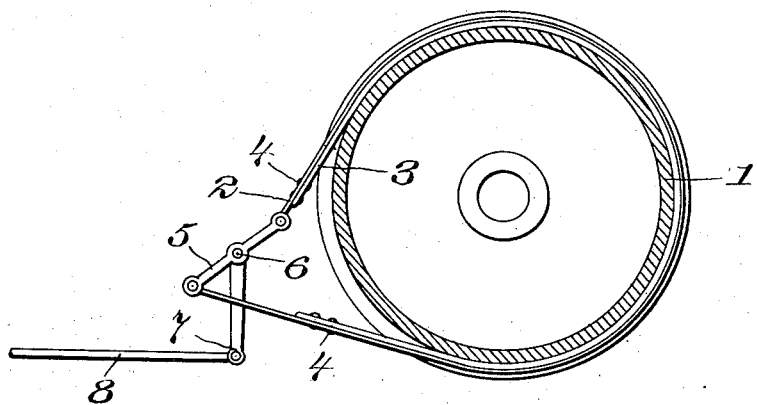
Figure 2:
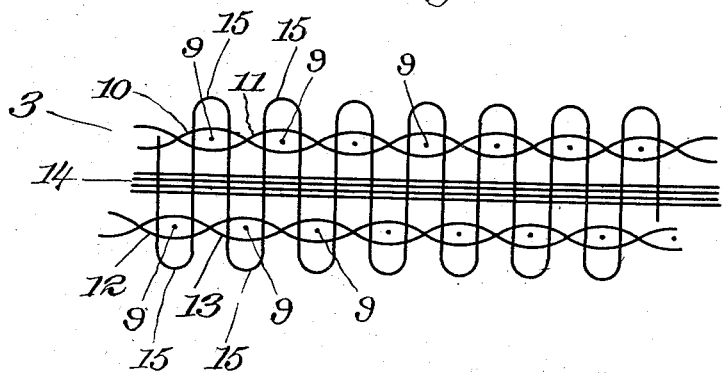

The best form of apparatus embodying my invention, at present known to me, is illustrated in the accompanying sheet of drawings in which:

Figure 1 is a vertical section of one form of brake band and brake drum to which my invention has been applied, and Fig. 2 is a cross section of my preferred form of asbestos strip or band for use in such apparatus.

Throughout the drawings, like reference figures indicate like parts.

1 represents the brake drum and 2 the usual metal band encircling the drum and having its ends connected to the two arms of lever 5. This lever is pivoted at 6 to a fixed pivot and has the bell crank arm 7, to which the brake rod 8 is connected.

3 is the strip of woven asbestos attached at or near either end to the metal band 2, by any suitable fastening means 4, 4, and overlying the face of the metal band.

While any form of woven asbestos material may be used, I prefer the form of double woven band shown in cross section in exaggerated form in Fig. 2. This band is composed of a series of warp threads 9, 9, 9, etc., so interwoven with the woof threads that portions 10 and 11 of the woof combine with certain of the warp threads to form a facing for the band. Portions 12 and 13 of the woof combine with other warp threads to form a back portion. Portions 14 pass in between the face and the back to form a stuffing, and portions 15 of the woof intertwine with all the warp threads to bind the parts together in one integral structure. Preferably the asbestos band, however formed, is impregnated with a solution of iron oxid, linseed oil, kauri gum and spirits of turpentine, of a consistency approximately that of varnish. This contributes to the lasting qualities of the band by increasing its density and cohesion.

In operation the asbestos strip is fastened inside of the metal band, as shown in Fig. 1, and when the same is caused to grip the drum by movement of the lever 5, or equivalent means, a high degree of friction is developed between the metal drum and the asbestos, which latter serves to promptly and evenly retard the speed of revolution of the drum. My invention finds a most useful application in the brake rigging of heavy motor cars.

Among the advantages of my invention may be mentioned the high coefficient of friction of asbestos on metal which is much greater than that of metal on metal, or of animal or vegetable fiber on metal; the fact that asbestos being a pure mineral substance will not burn and does not heat so rapidly as other fiber; and that it wears longer and does not disintegrate so readily under the abrasive and heating effects of the brake action. The particular form of asbestos band shown is advantageous as possessing great lasting qualities on account of its thickness and integral structure, and also that compressibility resulting from its thickness which enables the braking effect on the two wheels of a motor car to be approximately equalized even if the adjustment of the two brake bands is not quite perfect.

Of course other arrangements of textile fabric formed of asbestos might be employed and these asbestos strips can be used to advantage in forms of brake rigging other than that here shown and described.

Having, therefore, described my invention, I claim:

1. As an article of manufacture, a brake lining comprising several plies of asbestos fabric impregnated with a drying oil.

2. As an article of manufacture, a brake lining comprising several plies of asbestos fabric held together by a binder, the outer layers being impregnated with a drying oil.

3. A brake band formed of compressible woven asbestos textile fabric impregnated with a varnish-like solution.

4. A brake band formed of woven asbestos fiber impregnated with a varnish-like solution, composed of iron oxid, linseed oil, kauri gum and spirits of turpentine.

5. A brake band formed of compressible double woven asbestos threads composed of front and back portions bound together by certain of the woof threads and impregnated with a varnish-like solution.

6. A brake band formed of compressible double woven asbestos threads composed of front and back portions bound together by certain of the woof threads and impregnated with a drying oil.

7. As an article of manufacture, a brake lining comprising several plies of asbestos fabric and a binder.

8. A brake provided with a liner comprising a layer of asbestos impregnated with drying oil.

9. As an article of manufacture, a brake lining comprising several plies of asbestos fabric impregnated with a varnish-like solution.

10. As an article of manufacture, a brake lining comprising several plies of asbestos fabric held together by a binder, the outer layers being impregnated with a varnish-like solution.

11. As an article of manufacture a brake lining comprising a woven asbestos fabric and a binder.

Signed at New York, N. Y. this 23rd day of July, 1908.

LOUIS R. HOFF.

Witnesses:
 ARTHUR G. CUTTING,
 FRED J. MEDWAY.